(12) United States Patent
Shoda et al.

(10) Patent No.: US 12,363,428 B2
(45) Date of Patent: Jul. 15, 2025

(54) IMAGE PICKUP APPARATUS SIMULTANEOUSLY OBTAINING VISIBLE AND INVISIBLE LIGHT IMAGES, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventors: Satoshi Shoda, Tochigi (JP); Hiroshi Nakaoka, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 210 days.

(21) Appl. No.: 18/178,447

(22) Filed: Mar. 3, 2023

(65) Prior Publication Data

US 2023/0292003 A1   Sep. 14, 2023

(30) Foreign Application Priority Data

Mar. 11, 2022   (JP) .................................. 2022-038687

(51) Int. Cl.
*H04N 23/67* (2023.01)
*H04N 23/11* (2023.01)
*H04N 23/16* (2023.01)
*H04N 23/45* (2023.01)

(52) U.S. Cl.
CPC ............. *H04N 23/67* (2023.01); *H04N 23/11* (2023.01); *H04N 23/16* (2023.01); *H04N 23/45* (2023.01)

(58) Field of Classification Search
None
See application file for complete search history.

(56) References Cited

U.S. PATENT DOCUMENTS

2020/0344405 A1\* 10/2020 Okamoto .......... H01L 27/14605

FOREIGN PATENT DOCUMENTS

JP   2017003749 A   1/2017
JP   2021100253 A \*  7/2021

\* cited by examiner

*Primary Examiner* — Christopher Braniff
(74) *Attorney, Agent, or Firm* — Canon U.S.A., Inc. IP Division

(57) ABSTRACT

An image pickup apparatus includes an image sensor, a memory device, and a processor. The image sensor includes first pixels and second pixels that are arranged two-dimensionally and that respectively receive visible light and invisible light entering through an image pickup optical system. Each of the first pixels and the second pixels has photoelectric conversion elements that receive light beams passing through different pupil areas of the image pickup optical system. The memory device stores instructions. The processor executes the instructions to detect focus detection results from signals output from the first pixels and signals output from the second pixels, determine a lens position of the image pickup optical system based on the focus detection results, and determine an exposure condition of a time of image pickup with the image sensor according to the focus detection results.

25 Claims, 16 Drawing Sheets

*FIG. 16*

|  | $a_i$ | $b_i$ | $\alpha_i$ | $\beta_i$ |
|---|---|---|---|---|
| i=2.0 | 0.011 | -0.649 | -0.013 | 0.581 |
| i=4.0 | 0.008 | -0.433 | -0.005 | 0.318 |
| i=8.0 | 0.006 | -0.303 | -0.003 | 0.179 |
| i=16.0 | 0.005 | -0.194 | -0.001 | 0.102 |

IMAGE PICKUP APPARATUS SIMULTANEOUSLY OBTAINING VISIBLE AND INVISIBLE LIGHT IMAGES, CONTROL METHOD THEREFOR, AND STORAGE MEDIUM STORING CONTROL PROGRAM THEREFOR

BACKGROUND

Field of the Disclosure

The present disclosure relates to an image pickup apparatus, a control method therefor, and a storage medium storing a control program therefor. And particularly, it relates to autofocus control in the image pickup apparatus.

Description of the Related Art

An image pickup apparatus that is provided with a function to simultaneously pick up an optical image formed by visible light and an optical image formed by invisible light is developed. For example, Japanese Laid-Open Patent Publication (Kokai) No. 2017-3749 (JP 2017-3749A) suggests an image pickup apparatus that can simultaneously pick up images of which wavelength components differs at the same field angle. The image pickup apparatus separates light entering into an image pickup optical system into a light beam of a wavelength component in a visible region and a light beam of a wavelength component in an infrared region through a prism and forms the images. Moreover, the above-mentioned publication discloses a technique that estimates a deviation between focal planes due to difference of wavelength on the basis of pieces of information, such as a distance to an object from the image pickup apparatus, a zoom magnification, and wavelength characteristic of an image sensor, and controls a diaphragm so that depth of field will include both the focal planes of visible light and infrared light.

In a case where there is only one optical system that forms optical images, when one of light beams in the visible region and infrared region is focused, the other light beam cannot be focused and forms a blurred image because a focal length of an image pickup lens depends on a wave length of light. Moreover, there is an object that has a characteristic (hereinafter referred to as "a spectral characteristic of an object") that strongly reflects or is transparent to light of one wavelength band among visible light and infrared light. When such an object is picked up by separating into the wavelength bands of the visible region and the infrared region, a deviation between in-focus positions (focus positions) tends to occur.

In dealing with such an issue, the technique described in the above-mentioned publication enables image pickup in consideration of the deviation between the in-focus positions resulting from the difference between the spectral characteristics of the image pickup lens for the visible light and infrared light. However, since the technique cannot deal with the deviation between the in-focus positions resulting from the spectral characteristic of an object, both images of which wavelength bands differ cannot be simultaneously focused with high accuracy.

SUMMARY

Embodiments of the present disclosure provide an image pickup apparatus that is capable of simultaneously obtaining a visible light image and an invisible light image with high focus accuracy.

According to embodiments of the present disclosure, an image pickup apparatus includes an image sensor, a memory device, and at least one processor. The image sensor includes first pixels and second pixels that are arranged two-dimensionally and that respectively receive visible light and invisible light entering through an image pickup optical system. Each of the first pixels and the second pixels has photoelectric conversion elements that receive light beams passing through different pupil areas of the image pickup optical system. The memory device stores a set of instructions. The at least one processor executes the set of instructions to detect focus detection results from signals output from the first pixels and signals output from the second pixels, determine a lens position of the image pickup optical system based on the focus detection results, and determine an exposure condition of a time of image pickup with the image sensor according to the focus detection results.

According to embodiments of the present disclosure, the image pickup apparatus that is capable of simultaneously obtaining a visible light image and an invisible light image with high focus accuracy is provided.

Further features will become apparent from the following description of exemplary embodiments with reference to the attached drawings.

BRIEF DESCRIPTION OF THE DRAWINGS

FIG. 16 is a view showing examples of coefficients in approximate formulas showing relation between an image deviation amount and correction data.

DESCRIPTION OF THE EMBODIMENTS

Figure 1:
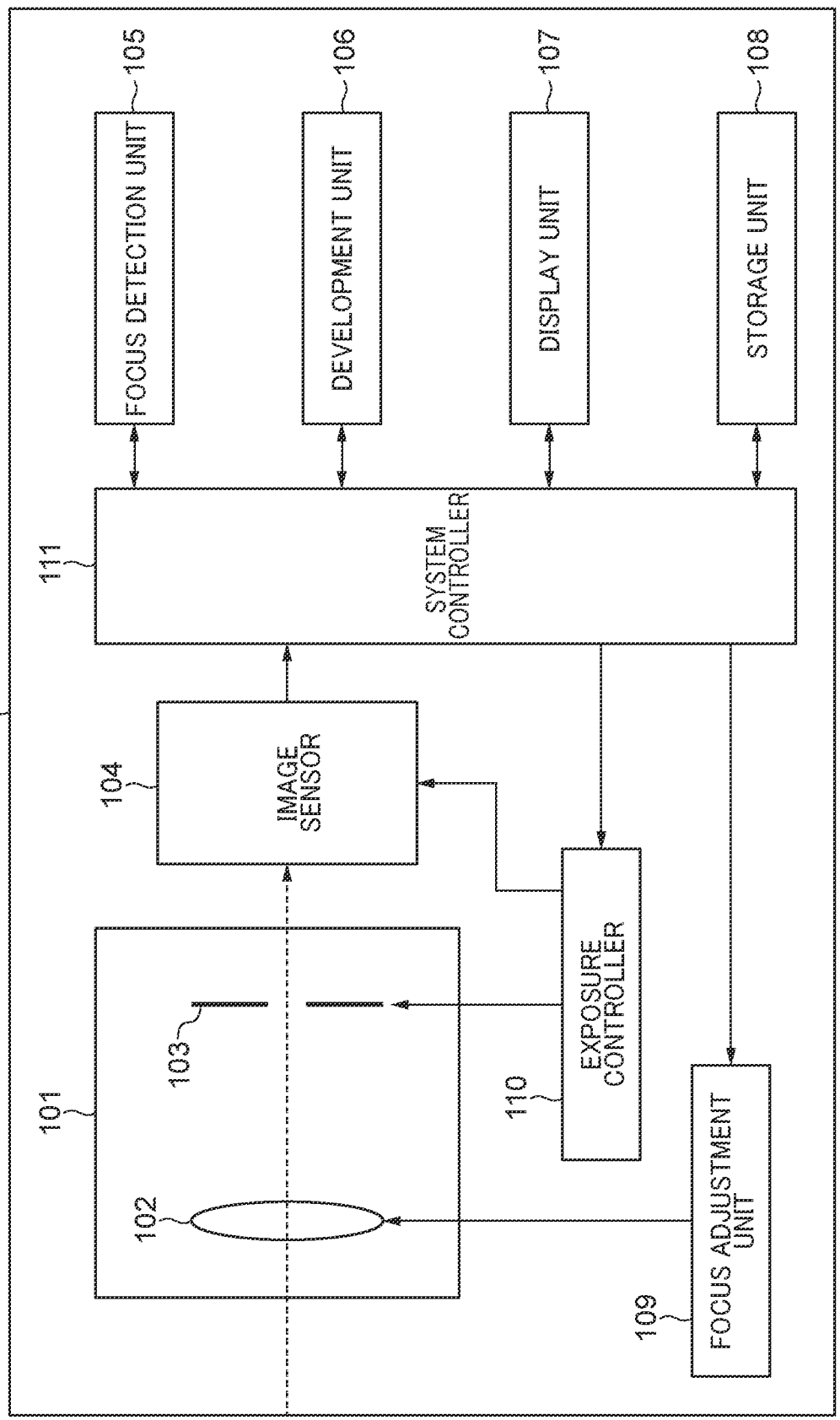
FIG. 1 is a block diagram schematically showing a configuration of an image pickup apparatus according to a first embodiment.

Hereafter, some exemplary embodiments according to the present disclosure will be described in detail by referring to the drawings. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination ofthe software and hardware contexts as described above. In addition, the term "element," "assembly," "component," or "device" may also refer to "circuit" with or without integration with packaging materials. Furthermore, depending on the context, the term "portion," "part," "device," "switch," or similar terms may refer to a circuit or a group of circuits. The circuit or group of circuits may include electronic, mechanical, or optical elements such as capacitors, diodes, transistors. For example, a switch is a circuit that turns on and turns off a connection. It can be implemented by a transistor circuit or similar electronic devices.

First, a first embodiment will be described. FIG. 1 is a block diagram schematically showing a configuration of an image pickup apparatus 100 according to the first embodiment. The image pickup apparatus 100 has an image pickup optical system 101, an image sensor 104, a system controller 111, a focus detection unit or circuit 105, a development unit or circuit 106, a display unit or circuit 107, a storage unit or circuit 108, a focus adjustment unit or circuit 109, and an exposure controller 110. The image pickup optical system 101 has a diaphragm 103 and a lens group 102 including a focus lens.

The image pickup optical system 101 images a light beam from an object on an image pickup surface of the image sensor 104 as an optical image. The image sensor 104 is a Complementary Metal Oxide Semiconductor (CMOS) sensor etc., for example, and converts the optical image of the object imaged on the image pickup surface into an analog electric signal by photoelectric conversion. The image sensor 104 shall be provided with an analog-to-digital (A/D) converter that converts the generated analog electric signal into a digital image signal and outputs it to the system controller 111 in this embodiment. Details of a pixel configuration of the image sensor 104 will be mentioned later.

The system controller 111 is a microcomputer that is constituted by a CPU, a Read-Only Memory (ROM), a Random Access Memory (RAM), etc. and manages entire control of the image pickup apparatus 100 including focus detection and exposure control. The focus detection unit 105 performs the focus detection from parallax images obtained by the image sensor 104. A focus detection result obtained by the focus detection unit 105 is transmitted to the exposure controller 110 and the focus adjustment unit 109 through the system controller 111.

The development unit 106 is constituted by a plurality of image processing circuits, receives the image signal obtained from the image sensor 104, performs image processes, such as white balance correction and noise reduction, and generates an image signal used for displaying and image data used for recording. The display unit 107 is a liquid crystal display, for example, obtains the image signal for displaying from the development unit 106, and displays the image. The storage unit 108 stores temporary data output from each unit and the image data for recording. It should be noted that the system controller 111 controls writing of various data into the storage unit 108 and reading of data from the storage unit 108.

The focus adjustment unit 109 is a drive mechanism that adjusts a lens position of the image pickup optical system 101 on the basis of the focus detection result (a defocus amount) detected by the focus detection unit 105. And specifically, it is the drive mechanism that moves the focus lens on an image-pickup optical axis. The exposure controller 110 determines exposure conditions, such as an aperture value (F value) and an exposure time, on the basis of focus detection information detected by the focus detection unit 105, adjusts an aperture diameter of the diaphragm 103, and controls the image sensor 104 on the basis of the exposure time. It should be noted that the exposure controller 110 can also determine the exposure time after changing an International Organization for Standardization (ISO) speed.

Figure 2:
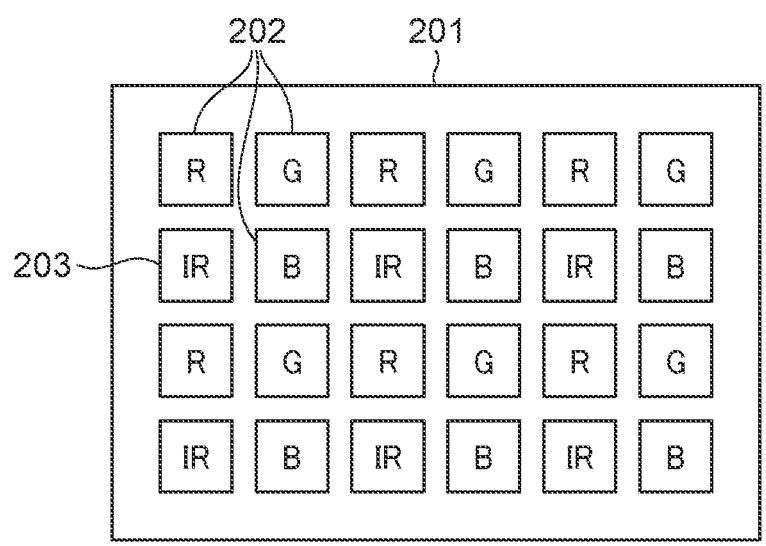
FIG. 2 is a view showing an array of color filters in an image sensor.

FIG. 2 is a view showing an array of color filters in the image sensor 104. The light receiving section 201 of the image sensor 104 is constituted by two-dimensionally arranging photoelectric conversion elements represented by photodiodes. Then, color filters 202 and infrared (IR) filters 203, which are respectively transparent to specific wavelength bands among the light beam from the object, are regularly arranged on the respective photoelectric conversion elements. The color filters 202, which enable reception of the visible light, include a filter transparent to red (R) light, a filter transparent to blue (B) light, and a filter transparent to green (G) light. Moreover, the IR filters 203 enable reception of the infrared light (are transparent to the infrared light). Light beams transmitting the color filters 202 and the IR filters 203 are photoelectrically converted by photoelectric conversion elements arranged directly under the respective filters and are output as electric signals.

Figure 3:
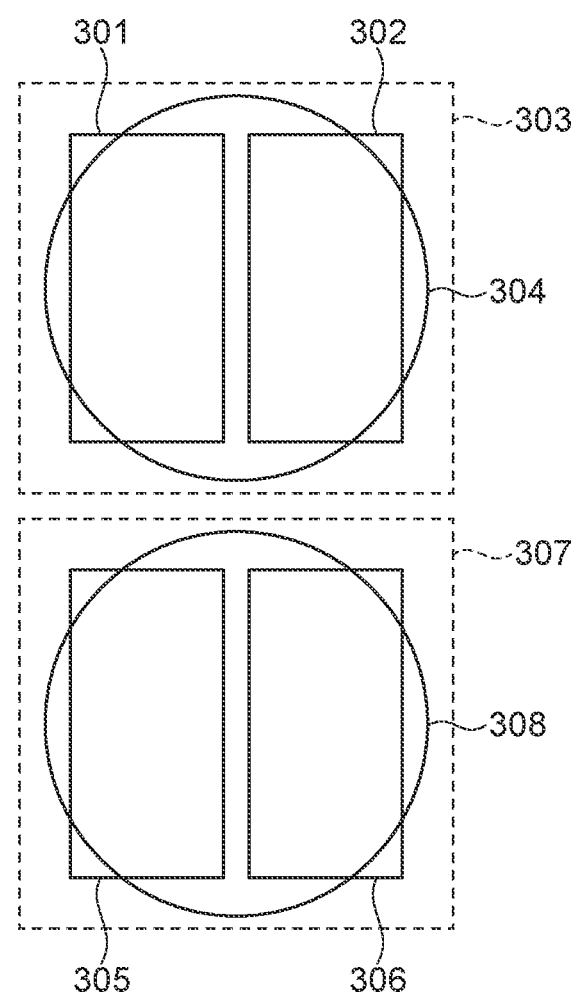
FIG. 3 is a view showing a configuration of pixels in the image sensor.

FIG. 3 is a view showing the configuration of pixels in the image sensor 104. FIG. 3 shows two pixel sections 303 and 307 arranged vertically.

The pixel section 303 is provided with two photoelectric conversion elements 301 and 302, and one micro lens 304 arranged in common to the photoelectric conversion elements 301 and 302. The color filters 202 and the IR filters 203 are arranged above micro lenses so that a filter for one color among R, G, B, and IR will be allocated to one micro lens 304 corresponding to one pixel section 303.

The pixel section 307 has a configuration equivalent to the pixel section 303. That is, the pixel section 307 is provided with two photoelectric conversion elements 305 and 306, and one micro lens 308 arranged in common to the photoelectric conversion elements 305 and 306. The color filters 202 and the IR filters 203 are arranged above micro lenses so that a filter for one color among R, G, B, and IR will be allocated to one micro lens 308 corresponding to one pixel section 307.

In the image sensor 104, many pixel sections equivalent to the pixel sections 303 and 307 are repeatedly arranged in two directions (a horizontal direction (lateral direction) and a vertical direction (longitudinal direction)) that intersect perpendicularly in the image pickup surface of the image sensor 104. One image is obtained from signals taken from the left photoelectric conversion elements like the photoelectric conversion elements 301 and 305. Another image is obtained from signals taken from the right photoelectric conversion elements like the photoelectric conversion elements 302 and 306. Thereby, a pair of image signals that are respectively generated by receiving the light beams of which incident directions differ are obtainable. Moreover, when the signals are taken from pairs of photoelectric conversion elements (for example, the photoelectric conversion elements 301 and 302) simultaneously, the image signal displaying on the display unit 107 or storing into the storage unit 108 is obtainable.

Figure 4:
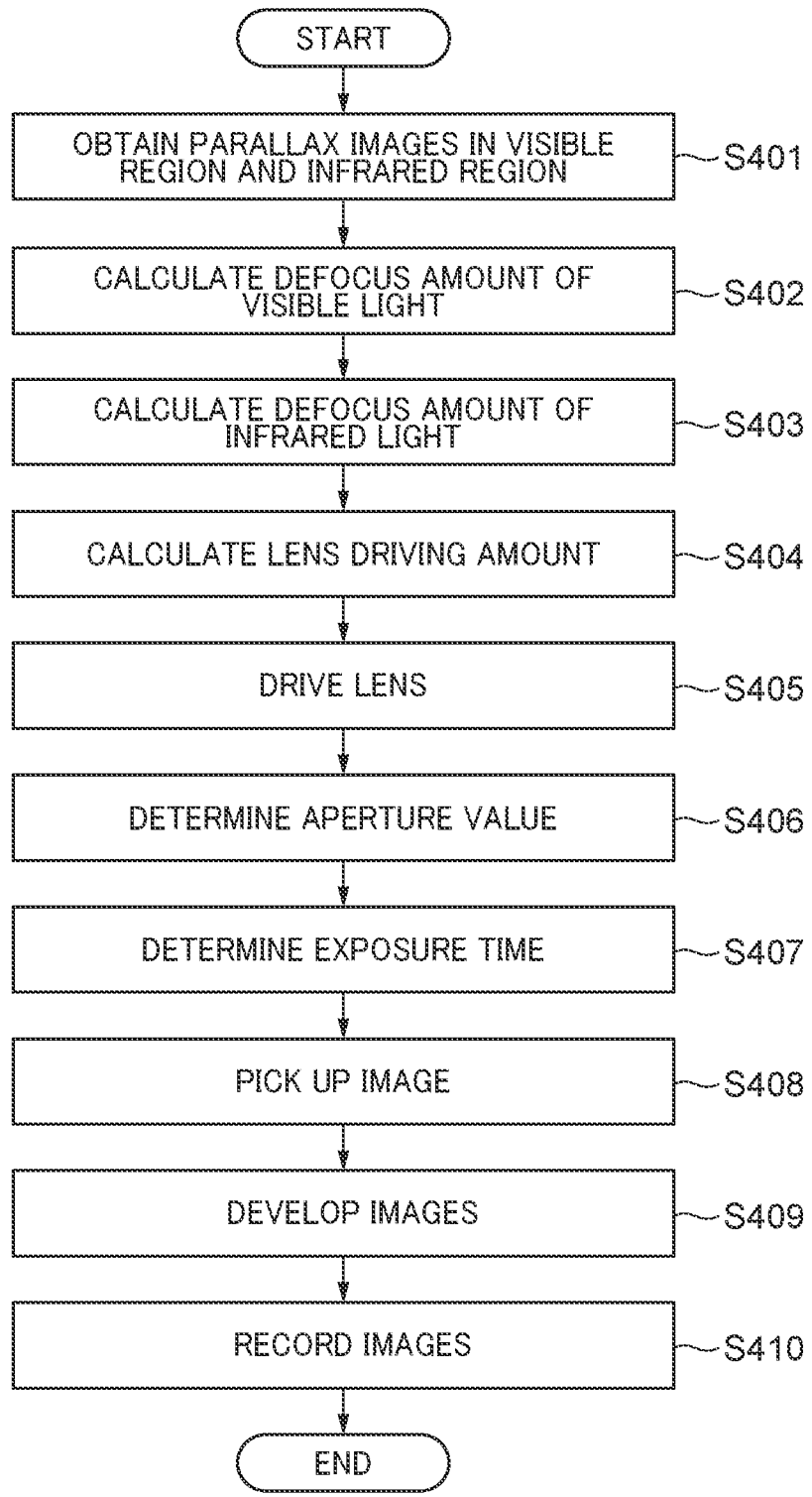
FIG. 4 is a flowchart describing image pickup control in the first embodiment.

FIG. 4 is a flowchart describing image pickup control in the image pickup apparatus 100. Each process (operation) represented by an S number in the flowchart in FIG. 4 is achieved when the system controller 111 runs a predetermined program to control operations of units of the image pickup apparatus 100.

In S401, the system controller 111 obtains signals of parallax images in a visible region (hereinafter referred to as "visible parallax images") from the image sensor 104. These images are formed by a light beam in the visible region on the image pickup surface of the image sensor 104. Moreover, in S401, the system controller 111 obtains signals of parallax images in an infrared region (hereinafter referred to as "infrared parallax images") from the image sensor 104. These images are formed by a light beam in the infrared region on the image pickup surface of the image sensor 104, Specifically, a signal of a first parallax image is obtained by outputs from the left photoelectric conversion elements like the photoelectric conversion elements 301 and 305 in FIG. 3 of the image sensor 104. In the same manner, a signal of a second parallax image is obtained by outputs from the right photoelectric conversion elements like the photoelectric conversion elements 302 and 306 in FIG. 3 of the image sensor 104. In this way, the visible parallax images (the first parallax image and second parallax image) are obtained from the pixel sections to which the color filters 202 are arranged. At the same time, the infrared parallax images (the first parallax image and second parallax image) are obtained from the pixel sections to which the IR filters 203 are arranged.

In S402, the focus detection unit 105 calculates a first defocus amount by using the first parallax image and second parallax image in the visible region, and temporarily stores the obtained defocus amount into the storage unit 108.

In S403, the focus detection unit 105 calculates a second defocus amount by using the first parallax image and second parallax image in the infrared region, and temporarily stores the obtained defocus amount into the storage unit 108.

Figure 5:
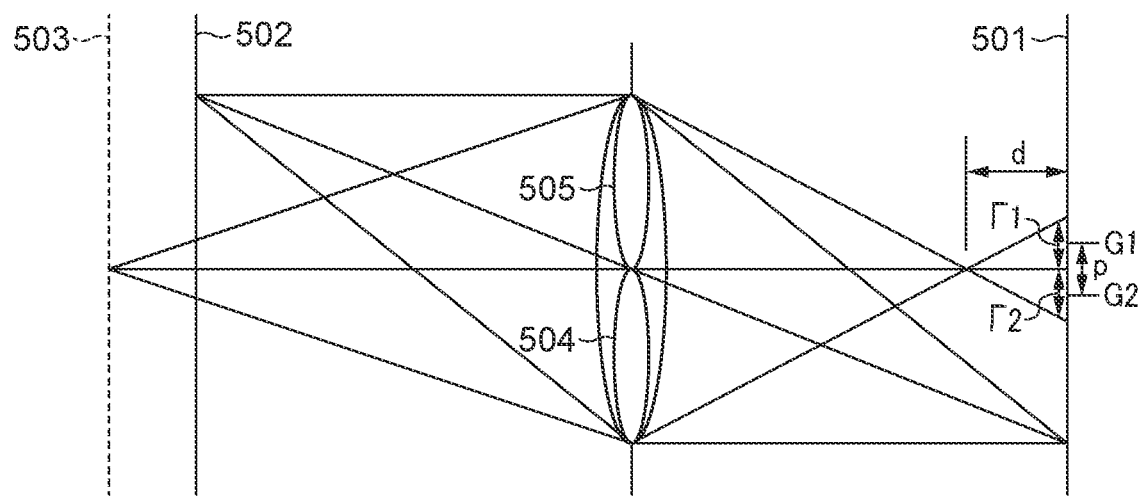
FIG. 5 is a view describing an image deviation amount between two parallax images.

Hereinafter, an image deviation amount between the first parallax image and second parallax image will be described. FIG. 5 is a view describing the image deviation amount between the first parallax image and second parallax image. An exit pupil of the image pickup optical system 101 is divided into two partial pupil areas 504 and 505. A defocus amount "d" is defined as a distance from an image forming position to an image pickup surface 501 of the image sensor 104. An object 502 is located at a position of an in-focus state (a focused state (d=0)). In the meantime, an object 503 is located at a position of a front focus state (d<0). The front focus state (d<0) and a rear focus state (d>0, not shown) are called as defocus states (|d|>0).

In the front focus state (d<0), a light beam passing the partial pupil area 504 among the light beam from the object 503 once condenses, and then, spreads to a blurred width $\Gamma_1$ around a centroid point G1 of the light beam. As a result, a blurred image is formed on the image pickup surface 501. The blurred image is received by the photoelectric conversion elements at one side (for example, the left side like the photoelectric conversion elements 301 and 305) of the pixel sections of the image sensor 104. As a result of this, the first parallax image is generated. Accordingly, the first parallax image is recorded as a blurred object image in which the image of the object 503 is blurred to the blurred width $\Gamma_1$ in the vicinity of the centroid point G1 on the image pickup surface 501. The blurred width $\Gamma_1$ of the object image is approximately proportional to the absolute value |d| of the defocus amount "d".

Similarly, the light beam passing the partial pupil area 505 spreads to a blurred width $\Gamma_2$ around a centroid point G2 of the light beam. As a result, a blurred image is formed on the image pickup surface 501. The blurred image is received by the photoelectric conversion elements at the other side (for example, the right side like the photoelectric conversion elements 302 and 306) of the pixel sections of the image sensor 104. As a result of this, the second parallax image is generated. Accordingly, the second parallax image is recorded as a blurred object image in which the image of the object 503 is blurred to the blurred width $\Gamma_2$ in the vicinity of the centroid point G2 on the image pickup surface 501. The blurred width $\Gamma_2$ of the object image is also approximately proportional to the absolute value |d| of the defocus amount d.

Accordingly, an image deviation amount "p" (a distance between the centroid points G1 and G2) between the object images in the first parallax image and second parallax image is also approximately proportional to the absolute value |d| of the defocus amount d. This is similar in a case of the rear focus state (d>0), except that the direction of the image deviation between the object images in the first parallax image and second parallax image becomes opposite to the direction in the front focus state.

In this way, the centroid points of the light beams emitted from one point of the object 503 in the defocus state deviate from each other between the first parallax image and the second parallax image on the image pickup surface 501. In S402, the focus detection unit 105 performs a correlation calculation process represented by a Sum of Absolute Difference (SAD) calculation to the first parallax image and second parallax image, and calculates the image deviation amount between the first parallax image and second parallax image on the basis of a correlation degree. At that time, the image deviation amount may be found in accordance with granularity on one pixel basis that constitutes the first parallax image and second parallax image. Otherwise, the image deviation amount may be found on each area basis defined by the predetermined number of pixels. The image deviation amount found in this way is convertible into the defocus amount.

In S404, the system controller 111 reads the first defocus amount and second defocus amount from the storage unit 108 and sends them to the focus adjustment unit 109. Then, the focus adjustment unit 109 calculates an internal division position that internally divides the two defocus amounts, and calculates a focus-lens drive amount by multiplying a predetermined conversion coefficient to the internal division position.

In S405, the focus adjustment unit 109 drives the focus lens that is one of the lenses constituting the lens group 102 on the basis of the focus-lens drive amount found in S404.

In S406, the system controller 111 reads the first defocus amount and second defocus amount from the storage unit 108, and sends them to the exposure controller 110. The exposure controller 110 calculates the absolute values of the two defocus amounts and determines an aperture value by dividing the defocus amounts by a diameter of a permissible circle of confusion decided beforehand. That is, the aperture value that sets the object within a depth of field in both the visible region and infrared region is determined.

In S407, the system controller 111 determines an exposure time required to obtain correct exposure with the aperture value determined in S406.

In S408, the system controller 111 picks up an image on the basis of image pickup parameters, such as the aperture value and exposure time. An image signal output from the image sensor 104 by the image pickup is stored in the storage unit 108 as RAW data.

In S409, the system controller 111 gives the image signal obtained in S408 to the development unit 106. The development unit 106 divides the image signal into an image signal corresponding to the visible region and an image signal corresponding to the infrared region and generates a recording image in the visible region and a recording image in the infrared region by performing various kinds of image processes.

In S410, the system controller 111 records the recording image in the visible region and the recording image in the infrared region generated in S409 to the storage unit 108, and, thereby, finishes this process.

In the first embodiment, two defocus amounts are found from the image deviation amounts detected from the parallax images in the visible region and the parallax images in the infrared region, and the focus lens is driven to the position that internally divides the two defocus amounts obtained as mentioned above. Moreover, the aperture value and exposure time are determined so that the object will fall within the depth of field in both the visible region and infrared region. Thereby, deviation of the in-focus positions resulting from the spectral characteristic of the object as an image pickup target is reduced, and the visible light image and infrared light image are obtainable simultaneously with high focus accuracy. As an application example of the image pickup apparatus 100, a system that recognizes a body (an object) with a visible light image and inspects its inside with an infrared light image is considered.

Although the first embodiment is configured so that the parallax images will be obtained with the single image sensor 104 using the exit pupil division method, the same effect is obtainable by a configuration that obtains parallax images using an image sensor that has sensitivity in the visible region and an image sensor that has sensitivity in the infrared region. Such a configuration is applicable to image pickup apparatuses according to a second embodiment and a third embodiment mentioned later. For example, what is necessary is configured so that incident light may reach the respective image sensors using a half mirror etc.

Furthermore, the first embodiment is configured to use the single focus detection unit 105 by time sharing to obtain the defocus amounts from the parallax images of the visible light and the parallax images of the infrared light sequentially. This configuration is not indispensable. It may be configured to provide focus detection units for the respective wavelength bands to find defocus amounts simultaneously in parallel.

Next, the second embodiment will be described. As the second embodiment, a configuration that enables shortening the exposure time by using a refocus process together will be described.

Figure 6:
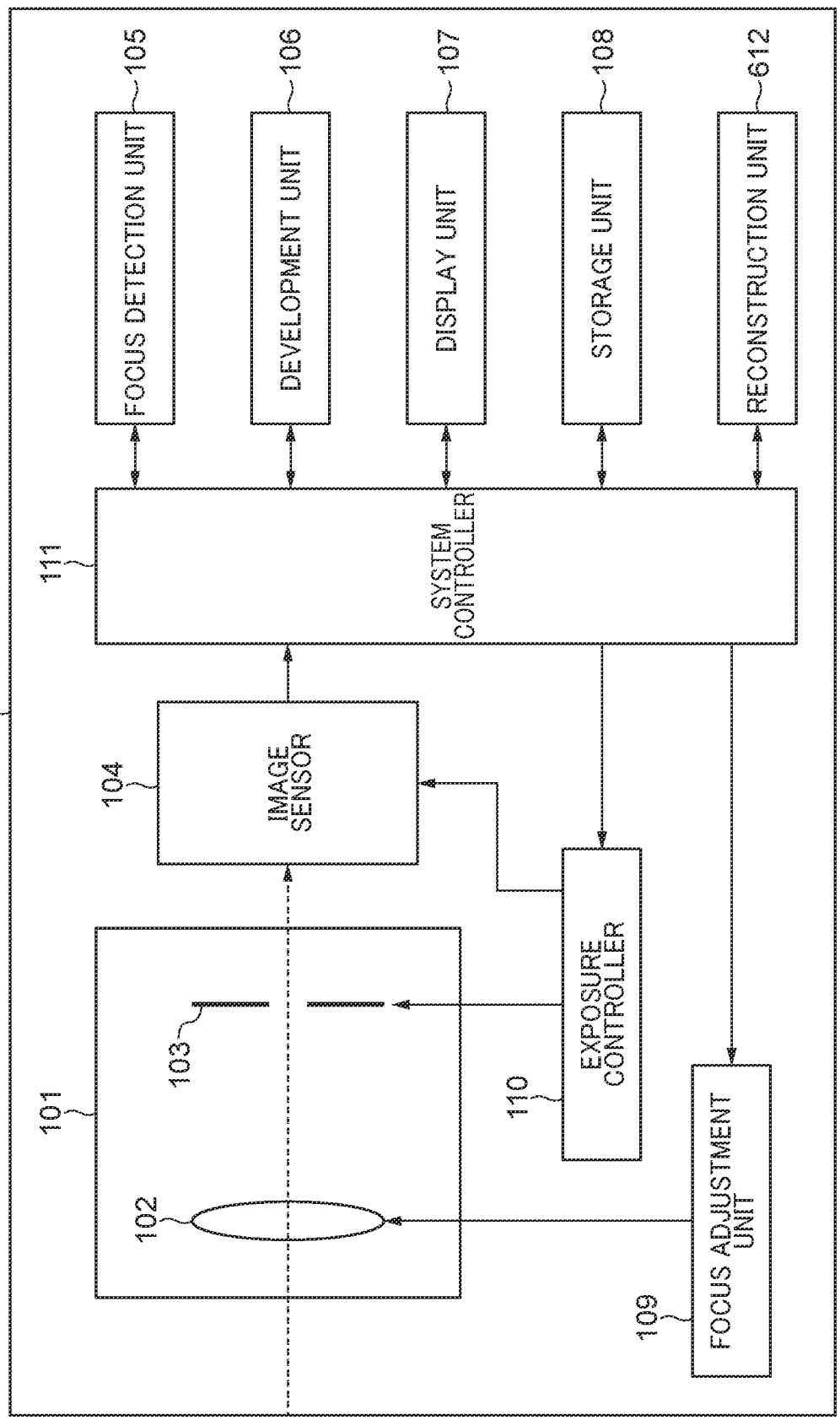
FIG. 6 is a block diagram schematically showing a configuration of an image pickup apparatus according to a second embodiment.

FIG. 6 is a block diagram schematically showing a configuration of an image pickup apparatus 600 according to the second embodiment. The image pickup apparatus 600 has an image pickup optical system 101, an image sensor 104, a system controller 111, a focus detection unit or circuit 105, a development unit or circuit 106, a display unit or circuit 107, a storage unit or circuit 108, a focus adjustment unit or circuit 109, an exposure controller 110, and a reconstruction unit or circuit 612. The image pickup optical system 101 has a diaphragm 103 and a lens group 102 including a focus lens.

The reconstruction unit 612 changes the in-focus position by a shift addition process and reconstructs a refocus image. Among the components of the image pickup apparatus 600, a component equivalent to a component of the image pickup apparatus 100 according to the first embodiment is represented by the same name and the same reference numeral and its description is omitted hereinafter.

Figure 7:
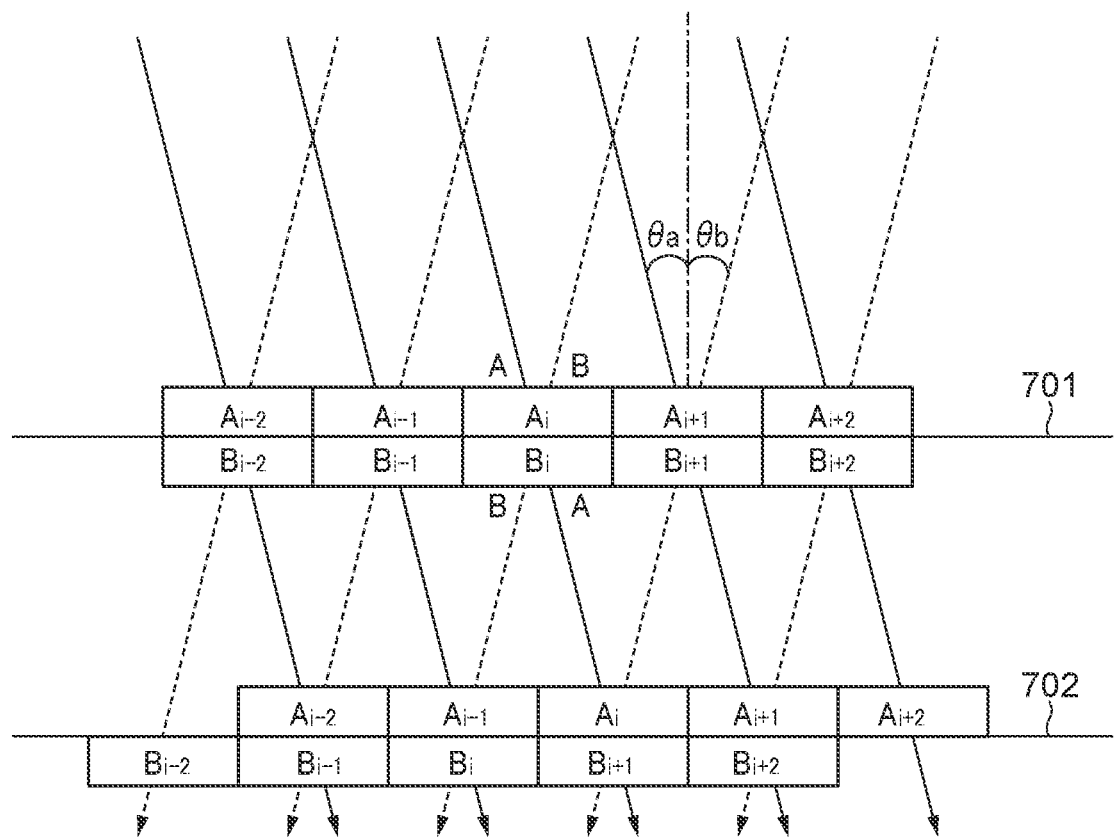
FIG. 7 is a schematic view describing a mechanism of a shift addition process executed by a reconstruction unit.

FIG. 7 is a schematic view describing a mechanism of the shift addition process executed by the reconstruction unit 612. A first parallax image and a second parallax image that are obtained from pixel sections in a column "i" ("i" is an integer) of the image sensor 104 arranged on the image pickup surface 701 are respectively represented as $A_i$ and $B_i$. The first parallax image $A_i$ corresponds to an image signal based on a light beam that enters into an i-th pixel section by a principal ray angle $\theta_a$ corresponding to the partial pupil area 504 in FIG. 5. The second parallax image $B_i$ corresponds to an image signal based on a light beam that enters into the i-th pixel section by a principal ray angle $\theta_b$ corresponding to the partial pupil area 505 in FIG. 5. It should be noted that the principal ray angles $\theta_a$ and $\theta_b$ are angles formed between a perpendicular line to the image pickup surface 701 and centroid lines of the entering light beams.

The first parallax image $A_i$ and the second parallax image $B_i$ have not only information about light intensity distributions but also information about the incident angles. Accordingly, reconstruction images on a virtual image plane 702 (images obtained when the image pickup surface 701 moves to the virtual image plane 702) are generable by performing the following process.

That is, the first parallax image $A_i$ is first moved in parallel to the virtual image plane 702 along the direction of the light beam. Subsequently, the second parallax image $B_i$ is moved in parallel to the virtual image plane 702 along the direction of the light beam. The reconstruction image on the virtual image plane 702 is generable by adding the first parallax image $A_i$ and the second parallax image $B_i$ that are moved in parallel to the virtual image plane 702.

A parallel moving amount of the first parallax image $A_i$ and second parallax image $B_i$ at that time shall be 0.5 pixels in the horizontal direction. In this case, the parallel movement of the first parallax image $A_i$ to the virtual image plane 702 along the light beam is equivalent to the shift of the first parallax image $A_i$ by +0.5 pixels in the horizontal direction. Moreover, the parallel movement of the second parallax image $B_i$ to the virtual image plane 702 along the light beam is equivalent to the shift of the second parallax image $B_i$ by −0.5 pixels in the horizontal direction. Accordingly, the reconstruction image in the virtual image plane 702 is generable by relatively shifting the first parallax image $A_i$ and second parallax image $B_i$ by +1 pixel (by correspondingly adding the first parallax image $A_i$ and a second parallax image $B_{i+1}$, in other words).

Relation between an image plane moving amount in moving the position of the image plane by shift-adding the first parallax image $A_i$ and second parallax image $B_i$ and a shift amount of the parallax images is determined according to the principal ray angles $\theta_a$ and $\theta_b$. A shift amount in shift-adding the parallax images is written as "s", a line number is written as "j", and a column number is written as "i". The first parallax image and second parallax image in j-line and i-column are respectively written as A(j, i) and B(j, i). The reconstruction image obtained by shift-adding the parallax images is written as I(j, i; s). The shift addition process is denoted by equation (1).

$$I(j,i;s)=A(j,i)+B(j,i+s) \quad (1)$$

Since the first parallax image A(j, i) and second parallax image B(j, i) are images obtained by the Bayer arrangement of the color filters 202 and IR filters 203 in the image sensor 104, when the shift amount s is set to a multiple of two, parallax images of the same color can be added. Namely, it is represented as "s=2n" (n is an integer). Moreover, the image plane moving amount can be changed for every pixel or every area by changing the shift amount s according to the image deviation amount between parallax images.

The reconstruction unit 612 receives the shift amount s as the image deviation amount from the focus detection unit 105 and performs the above-mentioned shift addition process on a pixel bases or an area basis on the basis of the shift amount s. Thereby, an image plane moving process (namely, a refocus process) according to the image deviation amount can be performed. When an object in a parallax image is blurred, an image signal in an in-focus state cannot be obtained even if the above-mentioned shift addition process is performed.

A method to generate a reconstruction image is not restricted to the above-mentioned method. For example, a reconstruction image may be generated after generating interpolation signals between pixels of the first parallax image A(j, i) and second parallax image B(j, i). Thereby, the shift amount s may be a non-integer and a degree of freedom in setting the shift amount s improves. Moreover, the image sensor 104 is configured to divide one pixel section into two components (one pixel section consists of two photoelectric conversion elements) as mentioned above. Accordingly, image signals in a state where the depth of field is deeper than that of the aperture value of the time of the image pickup by one step are obtainable as the first parallax image and second parallax image. That is, a range in which the refocus process is available shall be one step to the depth of field. In order to expand the focus adjustment range by the refocus process, what is necessary is to divide one pixel section into more than two parts (one pixel section consists of more than two photoelectric conversion elements).

Figure 8:
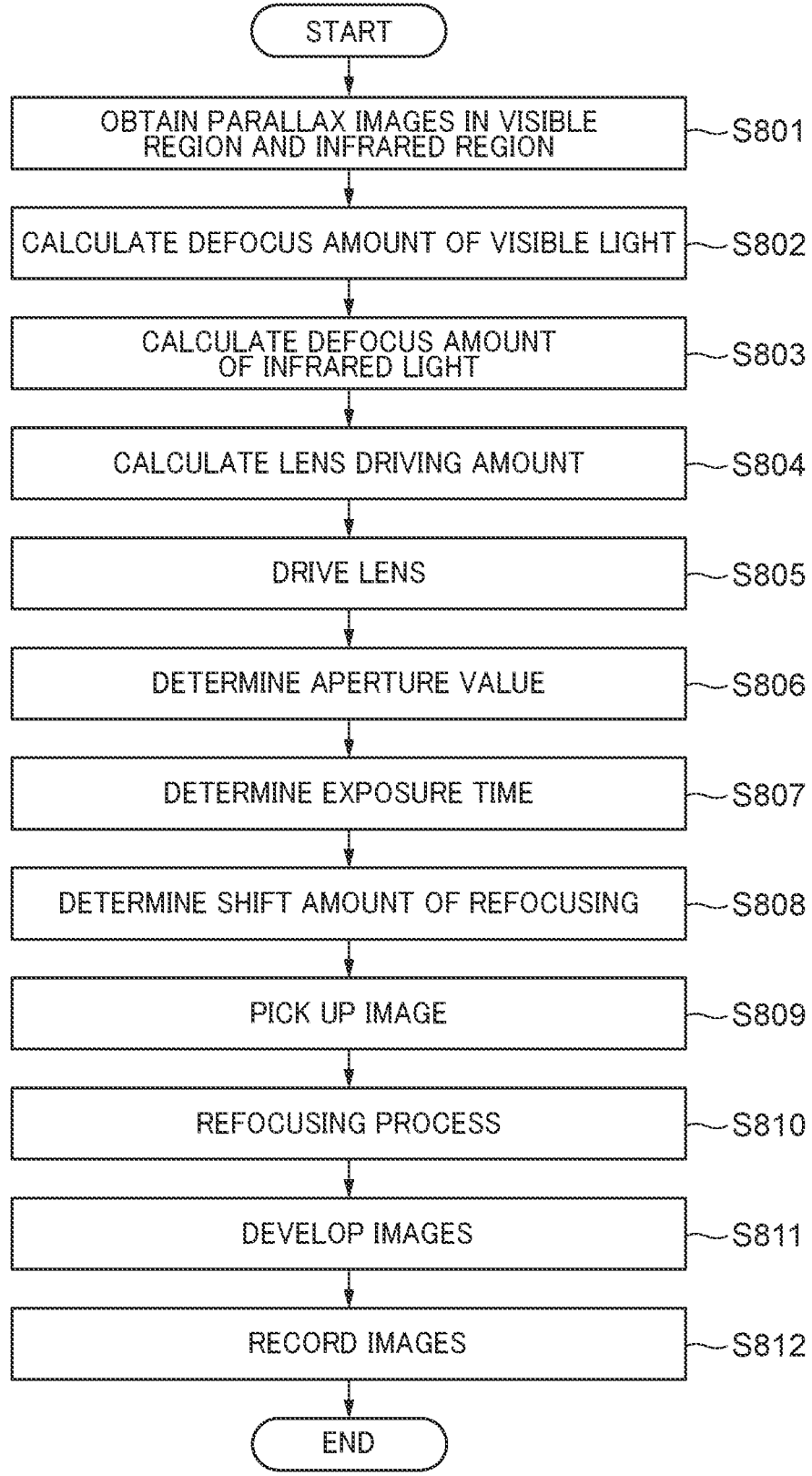
FIG. 8 is a flowchart describing image pickup control in the second embodiment.

FIG. 8 is a flowchart describing image pickup control in the image pickup apparatus 600. Each process (operation) represented by an S number in the flowchart in FIG. 8 is achieved when the system controller 111 runs a predetermined program to control operations of units of the image pickup apparatus 600.

Since a process in S801 through S805 is the same as the process in S401 through S405 of the flowchart in FIG. 4, its description is omitted.

In S806, the system controller 111 reads a first defocus amount and a second defocus amount, and calculates an aperture value by dividing the absolute values of these two defocus amounts by a diameter of a permissible circle of confusion so that the object will fall within the depth of field in both the visible region and infrared region. Then, an aperture value for the image pickup is determined by changing the calculated aperture value by one step to an open side.

Since a process in S807 is the same as the process in S407 of the flowchart in FIG. 4, its description is omitted.

In S808, the focus detection unit 105 calculates image deviation amounts on the basis of parallax images in the visible region and parallax images in the infrared region and determines a shift amount used to generate a refocus image on the basis of the calculated image deviation amounts.

Since a process in S809 is the same as the process in S408 of the flowchart in FIG. 4, its description is omitted.

In S810, the reconstruction unit 612 reads the visible parallax images obtained in S809 and the shift amount s corresponding to the visible region determined in S808, and generates the refocus image that is focused on the object image in the visible region. In the same manner, the reconstruction unit 612 reads the infrared parallax images obtained in S809 and the shift amount s corresponding to the infrared region determined in S808, and generates the refocus image that is focused on the object image in the infrared region.

In S811, the development unit 106 generates a recording image in the visible region and a recording image in the infrared region by applying a predetermined image process to the refocus images in the visible region and infrared region generated in S810.

A process in S812 is the same as the process in S410 of the flowchart in FIG. 4. And then, this process is finished.

As mentioned above, the reconstruction unit 612 generates the refocus image signal of which the in-focus position is changed within the range of the depth of field from the aperture value of the time of the image pickup by one step at the maximum in the second embodiment. Since an image can be picked up at a more open aperture value on a premise of adjustment of an in-focus position by the refocus process at that time, an image can be picked up while shortening an exposure time, which can reduce an image shake. It should be noted that the effect obtained in the first embodiment can be also obtained in the second embodiment.

Next, the third embodiment will be described. In the third embodiment, image signals focused on an object in both the visible region and infrared region are generated by generating the image signal in the infrared region by correcting infrared parallax images using an image deviation amount between visible parallax images.

Figure 9:
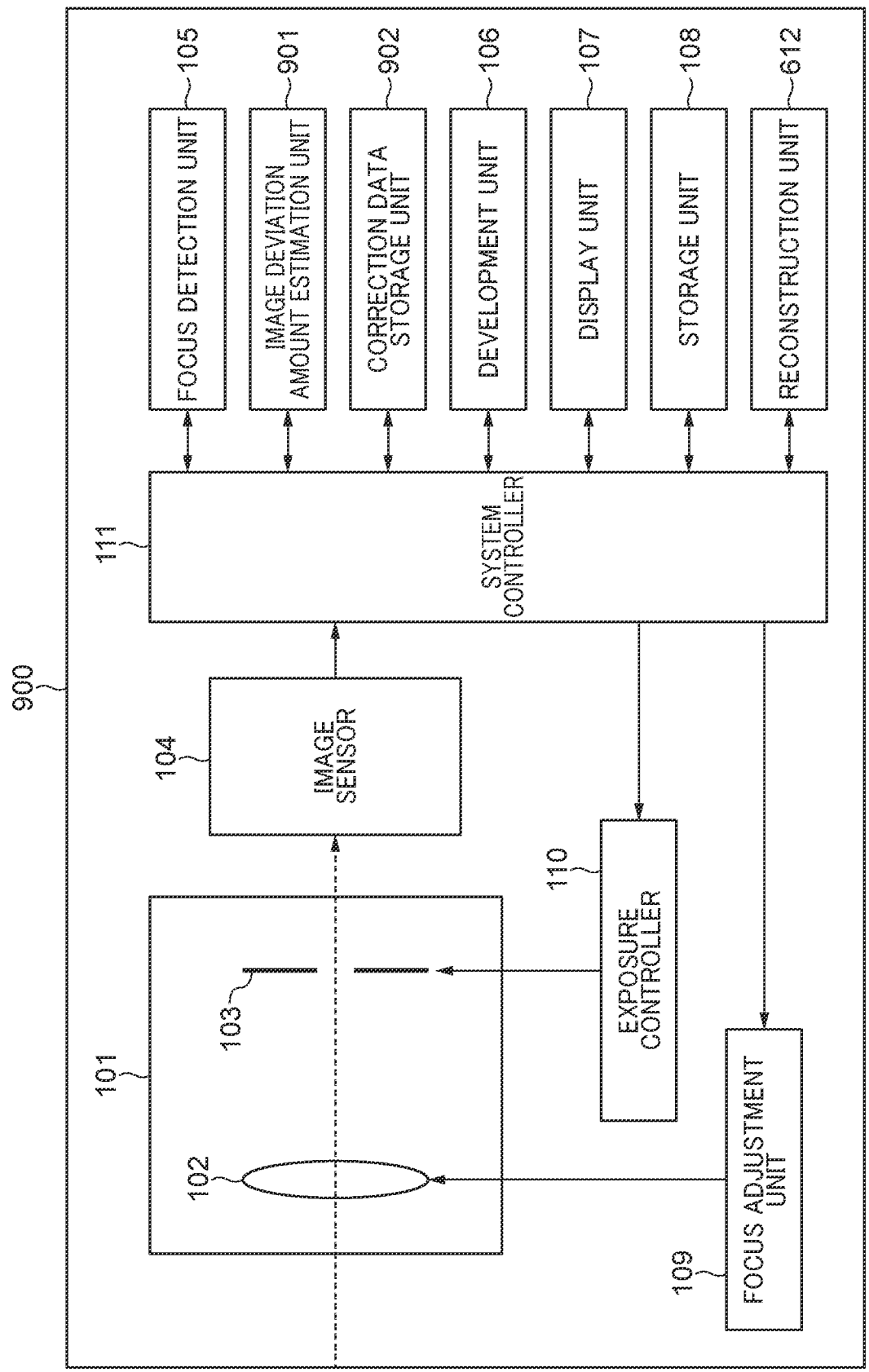
FIG. 9 is a block diagram schematically showing a configuration of an image pickup apparatus according to a third embodiment.

FIG. 9 is a block diagram schematically showing a configuration of an image pickup apparatus 900 according to the third embodiment. The image pickup apparatus 900 has an image pickup optical system 101, an image sensor 104, a system controller 111, a focus detection unit or circuit 105, a development unit or circuit 106, a display unit or circuit 107, a storage unit or circuit 108, a focus adjustment unit or circuit 109, an exposure controller 110, and a reconstruction unit or circuit 612. The image pickup optical system 101 has a diaphragm 103 and a lens group 102 including a focus lens. Since these components are equivalent to the components of the image pickup apparatus 600 according to the second embodiment, the same names and the same reference numerals are used and detailed descriptions are omitted hereinafter.

Furthermore, the image pickup apparatus 900 has an image deviation amount estimation unit or circuit 901 and a correction data storage unit or circuit 902. The image deviation amount estimation unit 901 estimates an image deviation amount between infrared parallax images on the basis of an image deviation amount between visible parallax images obtained by the focus detection unit 105 and correction data stored in the correction data storage unit 902. And then, the image deviation amount estimation unit 901 outputs the image deviation amount between the infrared parallax images to the system controller 111. The correction data storage unit 902 stores the correction data based on optical information obtained from the system controller 111. The correction data is used by the image deviation amount estimation unit 901. Details (concrete examples) of the correction data are mentioned later.

Figure 10:
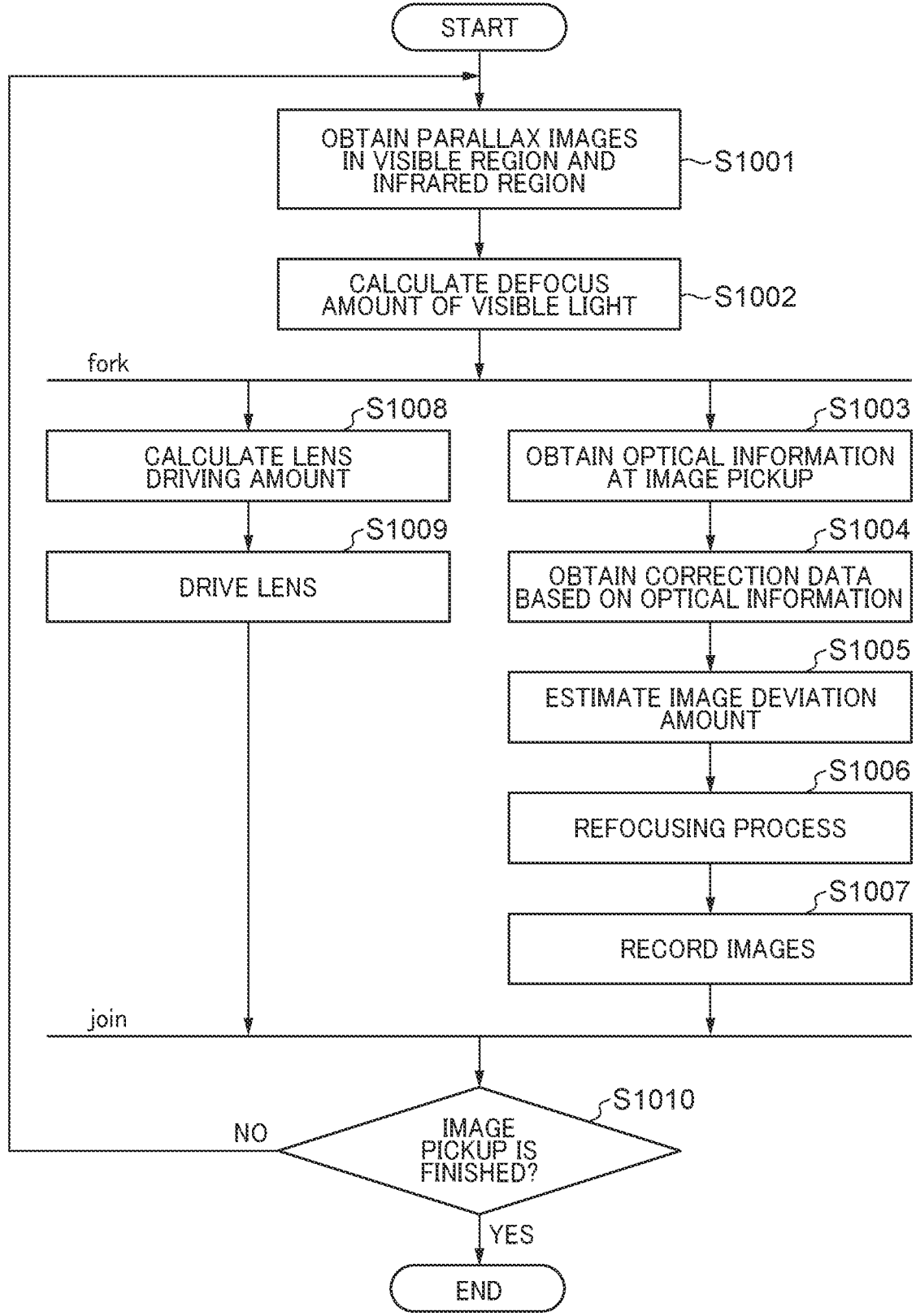
FIG. 10 is a flowchart describing image pickup control in the third embodiment.

FIG. 10 is a flowchart describing image pickup control in the image pickup apparatus 900. Each process (operation) represented by an S number in the flowchart in FIG. 10 is achieved when the system controller 111 runs a predetermined program to control operations of units of the image pickup apparatus 900.

Since a process in S1001 and S1002 is the same as the process in S401 and S402 of the flowchart in FIG. 4, its description is omitted. Since two routes including a process in S1003 through S1007 and a process in S1008 and S1009 are exclusive processes, the flow is branched after the process in S1002 in FIG. 10.

In S1003, the system controller 111 obtains the optical information about the image pickup optical system 101 of the time of obtainment of the signals of the visible parallax images and the signals of the infrared parallax images from the storage unit 108. Hereinafter, the process in S1003 is specifically described.

Figure 11:
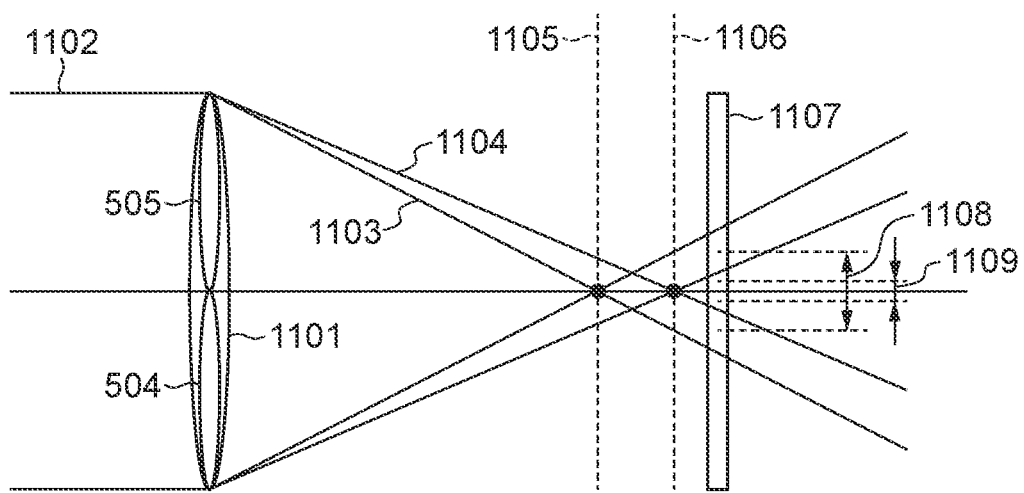
FIG. 11 is a view describing image deviation amounts between parallax images of visible light and parallax images of invisible light.

FIG. 11 is a schematic view describing an image deviation amount between parallax images of visible light and an image deviation amount between parallax images of invisible light. When a light beam 1103 in the visible region included in a light beam 1102 that comes from an object and passes a lens 1101 is refracted by the lens 1101 and forms an image at an image forming position 1105, an image deviation amount 1108 between visible parallax images is obtained on an image pickup surface 1107. In the meantime, a light beam 1104 in the infrared region included in the light beam 1102 from the object differs from the visible light beam 1103 because of wavelength dependency of the refractive index of the lens 1101, and forms an image at an image forming position 1106 that is different from the image forming position 1105 in the visible region. As a result, an image deviation amount 1109 that differs from the image deviation amount 1108 in the visible region is obtained as the image deviation amount between the infrared parallax images on the image pickup surface 1107.

In this way, the deviation of the image forming position occurred because of the wavelength dependency of the refractive index of the lens 1101 appears as wavelength dependency of the image deviation amount between the parallax images on the image pickup surface 1107. For example, even if the image plane of the visible light beam coincides with the image pickup surface and there is no image deviation, the image deviation between the infrared parallax images occurs because the image plane of the infrared light beam does not coincide with the image pickup surface.

Since the image deviation amount between the infrared parallax images differs from the image deviation amount between the visible parallax images found in S1002 because of the difference in the optical characteristic between the visible light and infrared light, the image deviation amount between the infrared parallax images is generated by estimation using the correction data. Moreover, an image deviation amount between parallax images depends on the aperture value defined by a focal length and an effective aperture of the image pickup optical system 101. Accordingly, the system controller 111 stores the optical information about the image pickup optical system 101 of the time of the image pickup to the storage unit 108.

Figure 12:
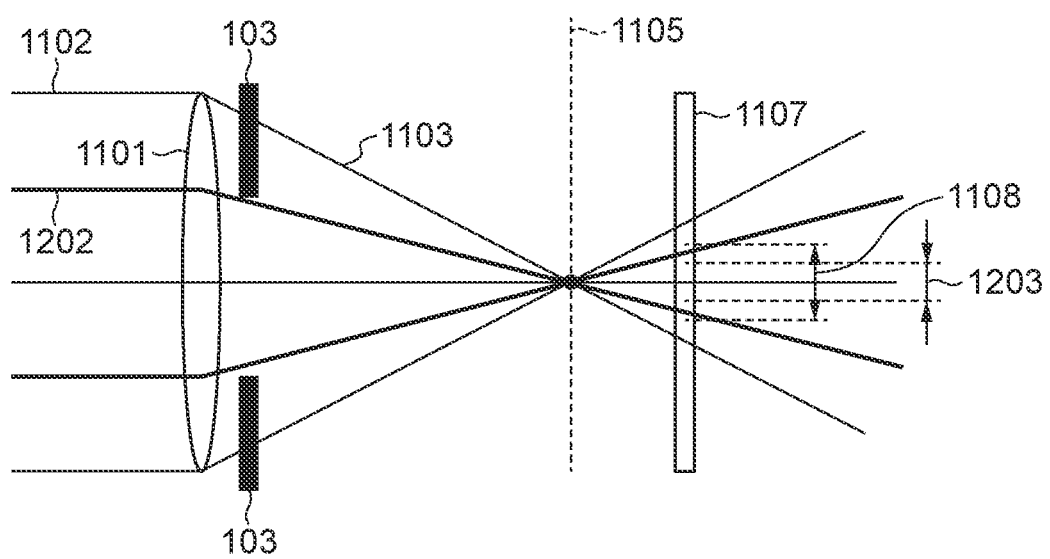
FIG. 12 is a schematic view describing a relation between variation of an optical condition and variation of the image deviation amount.

FIG. 12 is a schematic view describing the relation between the variation of the optical condition and the variation of the image deviation amount. Specifically, FIG. 12 shows the variation of the image deviation amount in varying the aperture diameter of the diaphragm 103 constituting the image pickup optical system 101 as the optical condition. The diaphragm 103 intercepts a part of the light beam 1102 from the object to adjust the amount of light that enters into the image sensor 104.

A light beam 1202 that is obtained by narrowing the incident light beam 1102 by the diaphragm 103 forms an image at the same image forming position 1105 as before narrowing, and then forms an image on the image pickup surface 1107. An image deviation amount 1203 after narrowing by the diaphragm 103 becomes smaller than the image deviation amount 1108 before narrowing. In this way, the image deviation amount that appears on the image pickup surface 1107 depends on the effective diameter of the image pickup optical system 101 even in the same focal length. Moreover, both the image deviation amount obtained from the visible parallax images and the image deviation amount obtained from the infrared parallax images depend on the aperture value.

The aperture value does not only depend on the diameter of the diaphragm 103 constituting the image pickup optical system 101 but also depends on the focal length of the image pickup optical system 101. Accordingly, when the image pickup optical system has a zoom lens and the focal length is variable, focal length information may be stored at the time of the image pickup, for example.

The description is referred back to the flowchart in FIG. 10. In S1004, the system controller 111 obtains the correction data from the correction data storage unit 902 on the basis of the optical information of the time of the image pickup by the image pickup optical system 101, and stores it to the storage unit 108.

In S1005, the image deviation amount estimation unit 901 estimates the image deviation amount in the infrared region on the basis of the image deviation amount in the visible region and the correction data obtained from the correction data storage unit 902. Hereinafter, the process in S1005 is specifically described.

Figure 13:
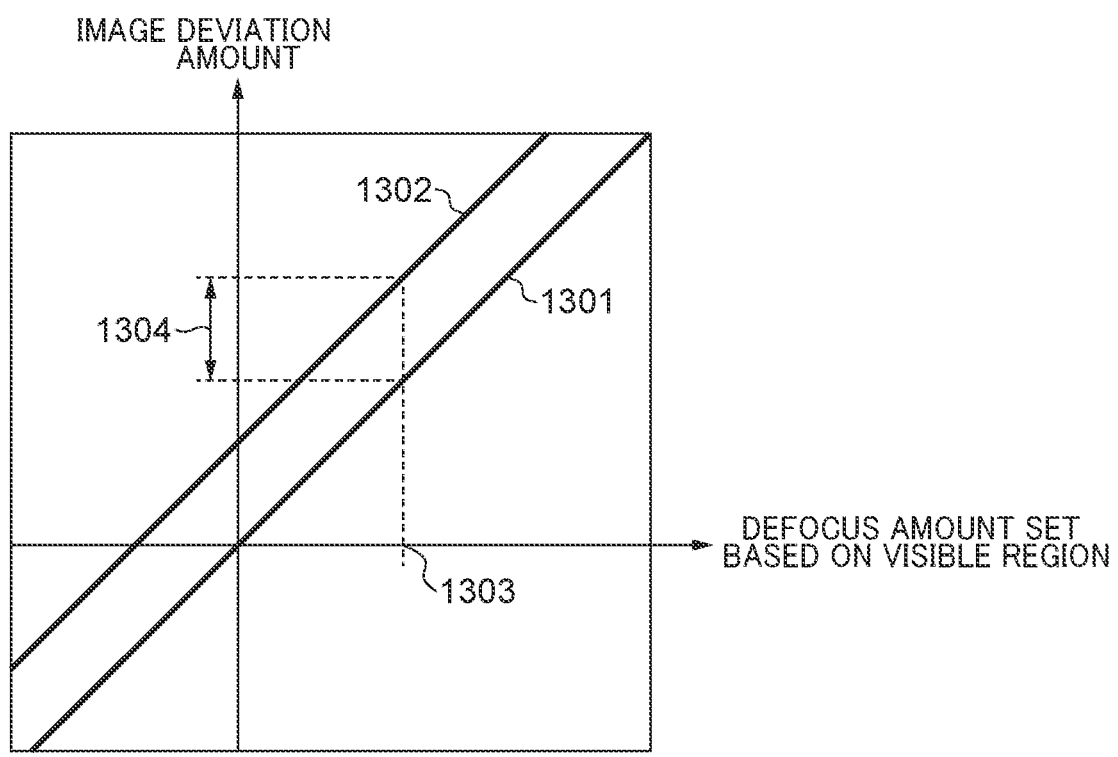
FIG. 13 is a graph showing relation between an image deviation amount obtained from parallax images in a visible region and an image deviation amount obtained from parallax images in an infrared region.

FIG. 13 is a graph showing relation between an image deviation amount obtained from visible parallax images and an image deviation amount obtained from infrared parallax images. A horizontal axis represents a defocus amount set based on a light beam in the visible region as a reference and a vertical axis represents an image deviation amount obtained from parallax images. When the defocus amount is 0 (zero), the image deviation amount obtained from the visible parallax images becomes 0 (zero) because the image plane agrees with the image pickup surface. When the defocus amount increases, the image plane disagrees with the image pickup surface. Accordingly, a characteristic of the image deviation amount obtained from the visible parallax images are denoted by a straight line 1301. Actually, the characteristic may not be denoted by the straight line because of the optical properties of the image pickup optical system 101 and image sensor 104. In the description, the characteristic shall be approximated by the straight line that passes an origin.

Against this, even if the defocus amount set based on the light beam in the visible region (as a reference) is 0, the image deviation amount obtained from the infrared parallax images does not become 0 because of the wavelength dependency of the refractive index of the image pickup optical system 101. Specifically, the image deviation amount obtained from the infrared parallax images exhibits a characteristic as represented by a straight line 1302 that is different from the characteristic of the image deviation amount obtained from the visible parallax images. It should be noted that the image deviation amount obtained from the infrared parallax images shall be approximated by the straight line in the description.

For example, when the defocus amount 1303 occurs in the image formed by the light beam in the visible region, a difference 1304 occurs between the image deviation amount obtained from the visible parallax images and the image deviation amount obtained from the infrared parallax image.

Accordingly, the image deviation amount between the infrared parallax images can be estimated by applying such difference information to the image deviation amount obtained from the visible parallax images.

Figure 14:
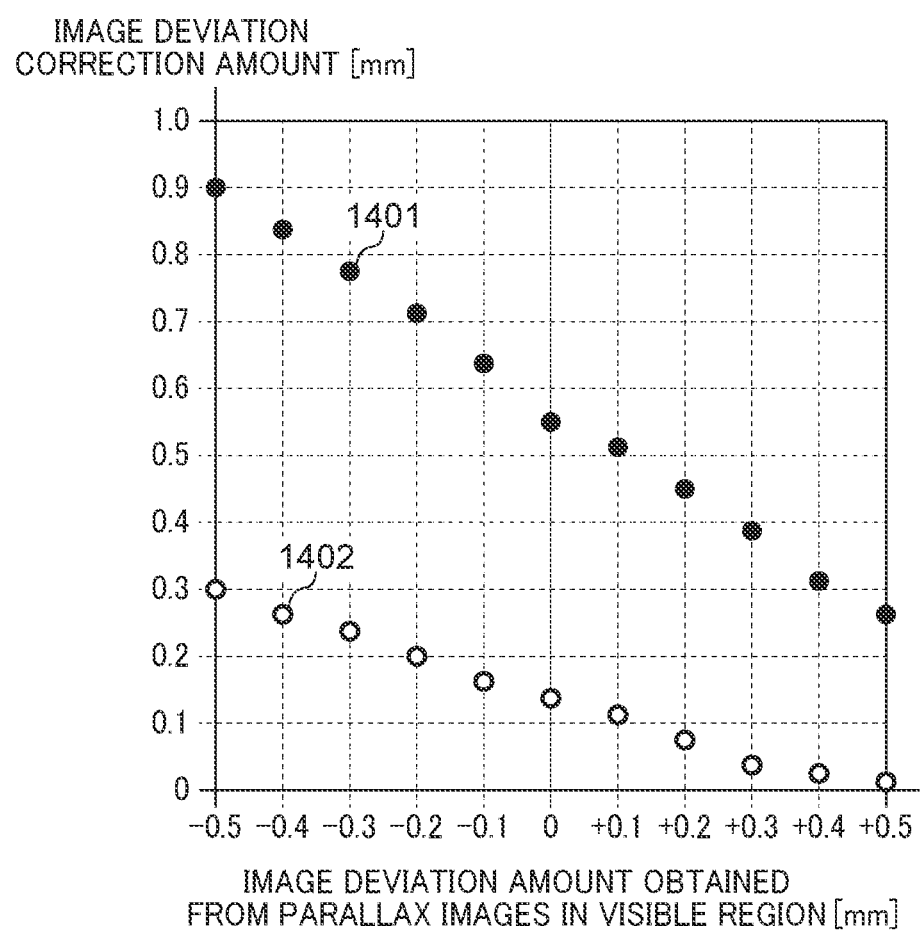
FIG. 14 is a graph showing examples of correction data.

FIG. 14 is a graph describing examples of the correction data stored in the correction data storage unit 902. Difference of the image deviation amount obtained from the infrared parallax images to the image deviation amount obtained from the visible parallax images can be used as the correction data. The correction data storage unit 902 holds discrete difference information as the correction data 1401 corresponding to the image deviation amount obtained from the visible parallax images. Such correction data 1401 may be beforehand stored in a nonvolatile storage (not shown) so as to be transferred to the correction data storage unit 902 in booting the image pickup apparatus 900.

The correction data 1401 corresponds to a case where the aperture value is 2.0 as the optical condition of the image pickup optical system 101. As described by referring to FIG. 12, when the difference information of the image deviation amount varies with the optical conditions of the image pickup optical system 101, correction data for every optical condition is stored in the correction data storage unit 902. For example, correction data 1402 for a case where the aperture value is 4.0 is also stored in the correction data storage unit 902 in addition to the correction data 1401. Then, the image deviation amount estimation unit 901 reads the optimal data from among the plurality sets of correction data stored in the correction data storage unit 902 in accordance with the optical condition of the image pickup optical system 101, and estimates the image deviation amount between the infrared parallax images.

Since the correction data 1401 is discrete, the image deviation amount between the infrared parallax images may be estimated by using interpolation data between discrete values, if needed. The interpolation data is generated by a known interpolation process, such as linear interpolation calculation or bicubic interpolation. The system controller 111 generates the infrared parallax images by adding the image deviation amount estimated by the image deviation amount estimation unit 901 to the visible parallax images.

Figure 15:
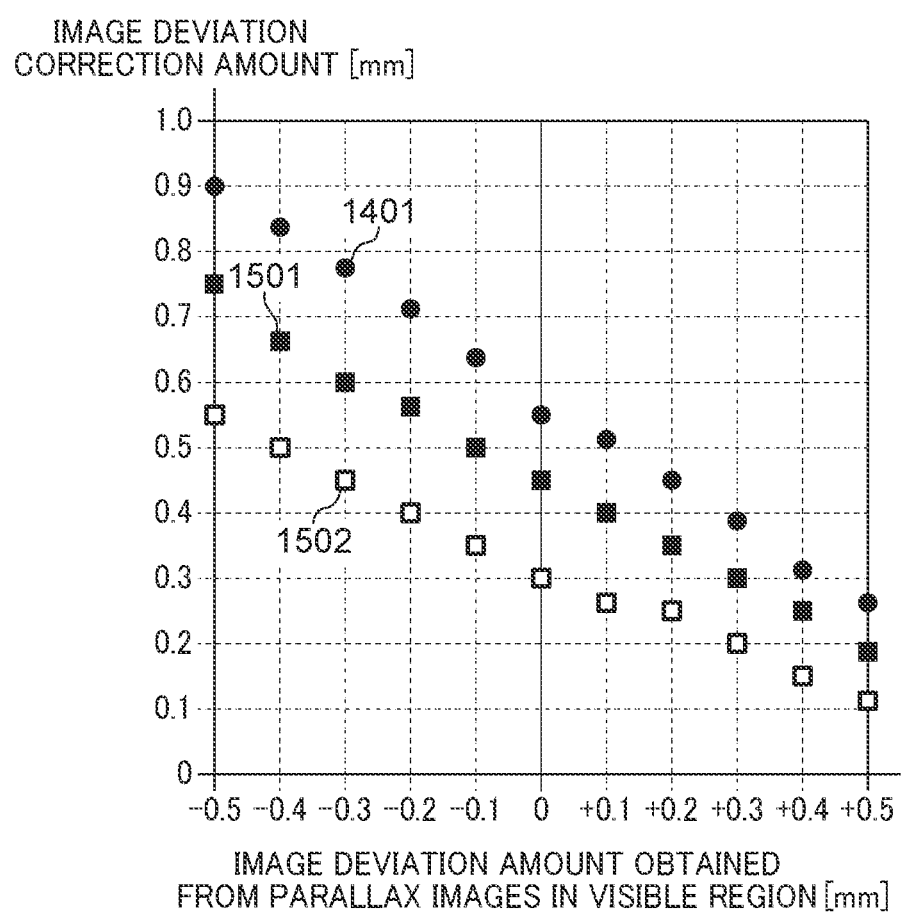
FIG. 15 is a graph showing other examples of correction data.

FIG. 15 is a graph showing correction data that prescribes an image deviation correction amount corresponding to an image height that is a distance from an optical-axis center on the image pickup surface 1107. A shape of an exit pupil on the image pickup surface 1107 depends on the image height.

As a result, the image deviation amount may vary with the image height even if the aperture value of the image pickup optical system 101 is constant. Accordingly, as shown in FIG. 15, correction data 1501 of an image height position 10 mm and correction data 1502 of an image height position 20 mm are prepared and are stored in the correction data storage unit 902 separately from the correction data 1401 of the image height position 0 (zero). This enables determination of the suitable image deviation correction amount corresponding to the pixel position in the parallax image.

FIG. 16 is a view showing a table that defines coefficients of approximate formulas expressing relationship between the image deviation amount obtained from the visible parallax images and the image deviation correction amount. The image deviation correction amount pi corresponding to the image deviation amount "x" that is obtained from the visible parallax images is approximately found by a linear function shown by the following equation (2). Hereinafter, f(r) is a tilt of the linear function and g(r) is a section of the linear function. An image height "r" is a distance from the optical-axis center on the image pickup surface 1107, and the tilt f(r) and the section g(r) are approximately found by linear functions of the image height "r" as shown by the following equations (3) and (4), respectively.

$$p_i = f(r) \cdot x + g(r) \tag{2}$$

$$f(r) = a_i \cdot r + b_i \tag{3}$$

$$g(r) = \alpha_i \cdot r + \beta_i \tag{4}$$

A subscript "i" shows a variation of the aperture value, and $a_i$, $b_i$, $\alpha_i$, and $\beta_i$ are stored as table-format correction data for every aperture value in the correction data storage unit 902 as shown in FIG. 16. The system controller 111 obtains four correction data ($a_i$, $b_i$, $\alpha_i$, $\beta_i$) corresponding to the aperture value from the table in FIG. 16. Thereby, the image deviation correction amount is generable on the basis of fewer correction data and the approximate formulas. It should be noted the read four correction data can be used as correction amounts as-is.

The description is referred back to the flowchart in FIG. 10. In S1006, the reconstruction unit 612 generates the refocus image in the infrared region on the basis of the signals of the infrared parallax images and the image deviation amount in the infrared region estimated by the image deviation amount estimation unit 901. Since the method to generate a refocus image has been already described in the second embodiment, its description is omitted. The refocus image signal in the infrared region obtained by the refocus process is recorded in the storage unit 108.

In S1007, the development unit 106 generates recording image data, stores it in the storage unit 108, generates a display image signal, and displays it on the display unit 107. The recording image data and display image signal in the visible region are generated by the development unit 106 applying the development process to the image signals that are obtained by adding the signals of the first parallax image and second parallax image in the visible region stored in the storage unit 108 for the respective pixel sections. The recording image data and display image signal in the infrared region are generated by the development unit 106 applying the development process to the image signals in the infrared region that are obtained by applying the refocus process with the reconstruction unit 612. When the process in S1007 is finished, the system controller 111 executes a process in S1010.

In S1010, the system controller 111 determines whether an instruction of termination of the image pickup is received. When determining that the instruction of termination of the image pickup is received (YES in S1010), the system controller 111 finishes this process. When determining that the instruction of termination of the image pickup is not received (NO in S1010), the system controller 111 returns the process to S1001.

When the defocus amount is found in S1002 on the basis of the visible parallax image signals, the focus adjustment unit 109 calculates a focus-lens drive amount in S1008 on the basis of the focus detection result detected by the focus detection unit 105.

Since a process in S1009 is the same as the process in S405 in the flowchart in FIG. 4 and the process in S1010 following S1009 has been described, their descriptions are omitted.

As mentioned above, the visible parallax images and infrared parallax images are obtained from the image sensor 104 simultaneously in the third embodiment. An image deviation map in the visible region is generated by finding an image deviation amount between parallax images on the basis of visible parallax images. In the meantime, an image deviation map is not generated from infrared parallax images. Then, the image deviation correction amount for estimating the image deviation amount between the infrared parallax images to the image deviation amount obtained from the visible parallax images is determined. Since the image deviation correction amount shows the relation between the image deviation amount between the visible parallax images and the image deviation amount between the infrared parallax images, the image deviation amount in the infrared region is estimated from the image deviation map of the visible region using the image deviation correction amount. This enables to reduce a processing load of the calculation of the image deviation amount in the infrared region. When an image deviation correction amount is generated by converting a defocus amount on the basis of an aperture value, correction data does not depend on an aperture value and the amount of the correction data can be reduced.

Since the refocus image in the infrared region is generated from the estimated image deviation amount, a composite image is obtainable by replacing a part of the pickup image in the visible region with a focused part in the refocus image while driving the focus lens on the basis of the visible parallax images.

Moreover, in the third embodiment, the image deviation correction amount for estimating the image deviation amount between the infrared parallax images is generated on the basis of the image deviation map of the visible parallax images, and the infrared parallax images are estimated. This configuration is not indispensable. An image deviation map of the infrared parallax images may be generated. And the image deviation correction amount for estimating the image deviation amount between the visible parallax images may be generated on the basis of the image deviation map generated. For example, when an object under dark environment is picked up while irradiating infrared light, a signal level of an image signal in the infrared region is higher than that of an image signal in the visible region, and a noise separation performance of the infrared image signal is considered to be higher. Accordingly, in such a case, images that focus on the object are obtainable in both the visible region and infrared region by driving the image pickup optical system 101 on the basis of the infrared parallax images. In other words, a difference in whether the reference is the visible region or the infrared region is a relative difference in whether correction data stored in the correction data storage unit 902 is based on the visible region or the infrared region. Accordingly, the visible parallax image may be the reference, or the infrared parallax images may be the reference. The same effect is obtainable in either case.

Although the disclosure has been described in detail on the basis of the suitable embodiments, the disclosure is not limited to these specific embodiments, and various configurations that do not deviate from the scope of the disclosure are also included in the disclosure. Furthermore, each embodiment mentioned above shows one embodiment of the disclosure, and the embodiments can be combined suitably.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While various embodiments of the present disclosure have been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-038687, filed Mar. 11, 2022, which is hereby incorporated by reference herein in its entirety.

What is claimed is:

1. An image pickup apparatus comprising:
an image sensor including first pixels and second pixels that are arranged two-dimensionally and that respectively receive visible light and invisible light entering through an image pickup optical system, wherein each of the first pixels and the second pixels has photoelectric conversion elements that receive light beams passing through different pupil areas of the image pickup optical system;
a memory device that stores a set of instructions; and at least one processor that executes the set of instructions to:
  detect a first defocus amount based on signals output from the first pixels and a second defocus amount based on signals output from the second pixels as focus detection results;
  determine a position that internally divides the first defocus amount and the second defocus amount as a lens position of the image pickup optical system; and
  determine an exposure condition of a time of image pickup with the image sensor according to the focus detection results.

2. The image pickup apparatus according to claim 1, wherein the at least one processor executes instructions in the memory device to:
  set an aperture value of the image pickup optical system to a value changed by one step to an open side from an aperture value determined so that both an object picked up by the first pixels and an object picked up by the second pixels fall within a depth of field;
  generate a refocus image by applying a shift addition process to parallax images obtained from the signals output from the first pixels; and generate a refocus image by applying the shift addition process to parallax images obtained from the signals output from the second pixels.

3. The image pickup apparatus according to claim 1, wherein the at least one processor executes instructions in the memory device to:
  set an aperture value of the image pickup optical system to a value changed by one step to an open side from an aperture value determined so that both an object picked up by the first image sensor and an object picked up by the second image sensor fall within a depth of field;
  generate a refocus image by applying a shift addition process to parallax images obtained from the signals output from the first image sensor; and
  generate a refocus image by applying the shift addition process to parallax images obtained from the signals output from the second image sensor.

4. An image pickup apparatus comprising:
  an image sensor including first pixels and second pixels that are arranged two-dimensionally and that respectively receive visible light and invisible light entering through an image pickup optical system, wherein each of the first pixels and the second pixels has photoelectric conversion elements that receive light beams passing through different pupil areas of the image pickup optical system;
  a memory device that stores a set of instructions; and
  at least one processor that executes the set of instructions to:
    detect focus detection results from signals output from the first pixels and signals output from the second pixels;
    determine a lens position of the image pickup optical system based on the focus detection results;
    determine an exposure condition of a time of image pickup with the image sensor according to the focus detection results; and
    set an aperture value of the image pickup optical system so that both an object picked up by the first pixels and an object picked up by the second pixels fall within a depth of field.

5. The image pickup apparatus according to claim 4, wherein the at least one processor executes instructions in the memory device to determine an exposure time of the image sensor so that correct exposure will be obtained with the set aperture value.

6. An image pickup apparatus comprising:
  a first image sensor including first pixels that are arranged two-dimensionally and that receive visible light entering through an image pickup optical system, wherein each of the first pixels has photoelectric conversion elements that receive light beams passing through different pupil areas of the image pickup optical system;
  a second image sensor including second pixels that are arranged two-dimensionally and that receive infrared light entering through the image pickup optical system, wherein each of the second pixels has photoelectric conversion elements that receive light beams passing through different pupil areas of the image pickup optical system;
  a memory device that stores a set of instructions; and
  at least one processor that executes the set of instructions to:
    detect a first defocus amount based on signals output from the first image sensor and a second defocus amount based on signals output from the second image sensor as focus detection results;
    determine a position that internally divides the first defocus amount and the second defocus amount as a lens position of the image pickup optical system; and
    determine an exposure condition of a time of image pickup with the first image sensor and the second image sensor according to the focus detection results.

7. An image pickup apparatus comprising:
  a first image sensor including first pixels that are arranged two-dimensionally and that receive visible light entering through an image pickup optical system, wherein each of the first pixels has photoelectric conversion elements that receive light beams passing through different pupil areas of the image pickup optical system;
  a second image sensor including second pixels that are arranged two-dimensionally and that receive infrared light entering through the image pickup optical system, wherein each of the second pixels has photoelectric conversion elements that receive light beams passing through different pupil areas of the image pickup optical system;
  a memory device that stores a set of instructions; and
  at least one processor that executes the set of instructions to:
    detect focus detection results from signals output from the first image sensor and signals output from the second image sensor;
    determine a lens position of the image pickup optical system based on the focus detection results;
    determine an exposure condition of a time of image pickup with the first image sensor and the second image sensor according to the focus detection results; and
    set an aperture value of the image pickup optical system so that both an object picked up by the first image sensor and an object picked up by the second image sensor fall within a depth of field.

8. The image pickup apparatus according to claim 7, wherein the at least one processor executes instructions in the memory device to determine an exposure time of the first image sensor and the second image sensor so that correct exposure will be obtained with the set aperture value.

9. An image pickup apparatus comprising:
an image sensor including first pixels and second pixels that are arranged two-dimensionally and that respectively receive visible light and invisible light entering through an image pickup optical system, wherein each of the first pixels and the second pixels has photoelectric conversion elements that receive light beams passing through different pupil areas of the image pickup optical system;
a storage circuit that stores correction data that shows a difference in an optical characteristic between a light beam that is received by the first pixels and a light beam that is received by the second pixels;
a memory device that stores a set of instructions; and
at least one processor that executes the set of instructions to:
detect a focus detection result from one of a group of signals output from the first pixels and a group of signals output from the second pixels;
determine a lens position of the image pickup optical system based on the focus detection result; and
estimate an image deviation amount between parallax images obtained from signals that are not used for detecting the focus detection result using the correction data.

10. The image pickup apparatus according to claim 9, wherein the correction data is an image deviation correction amount for estimating the image deviation amount between the parallax images obtained from the signals that are not used for detecting the focus detection result according to an image deviation amount between parallax images obtained from signals that are used for detecting the focus detection result.

11. The image pickup apparatus according to claim 10, wherein the storage circuit stores the image deviation correction amount as one of a value corresponding to an image height, a value corresponding to an aperture value, and a coefficients of an approximate formula.

12. The image pickup apparatus according to claim 9, wherein the at least one processor executes instructions in the memory device to generate a refocus image by applying a shift addition process to the image deviation amount estimated between the parallax images obtained from the signals that are not used for detecting the focus detection result.

13. An image pickup apparatus comprising:
a first image sensor including first pixels that are arranged two-dimensionally and that receive visible light entering through an image pickup optical system, wherein each of the first pixels has photoelectric conversion elements that receive light beams passing through different pupil areas of the image pickup optical system;
a second image sensor including second pixels that are arranged two-dimensionally and that receive infrared light entering through the image pickup optical system, wherein each of the second pixels has photoelectric conversion elements that receive light beams passing through different pupil areas of the image pickup optical system;
a storage circuit that stores correction data that shows a difference in an optical characteristic between a light beam that is received by the first image sensor and a light beam that is received by the second image sensor;
a memory device that stores a set of instructions; and
at least one processor that executes the set of instructions to:
detect a focus detection result from signals output from one of the first image sensor and the second image sensor;
determine a lens position of the image pickup optical system based on the focus detection result; and
estimate an image deviation amount between parallax images obtained from signals that are not used for detecting the focus detection result using the correction data.

14. A control method for an image pickup apparatus that has an image sensor including first pixels and second pixels that are arranged two-dimensionally and that respectively receive visible light and invisible light entering through an image pickup optical system, wherein each of the first pixels and the second pixels has photoelectric conversion elements that receive light beams passing through different pupil areas of the image pickup optical system, the control method comprising:
detecting a first defocus amount based on signals output from the first pixels and a second defocus amount based on signals output from the second pixels as focus detection results;
determining a position that internally divides the first defocus amount and the second defocus amount as a lens position of the image pickup optical system; and
determining an exposure condition of a time of image pickup with the image sensor according to the focus detection results.

15. A control method for an image pickup apparatus that has a first image sensor including first pixels that are arranged two-dimensionally and that receive visible light entering through an image pickup optical system, wherein each of the first pixels has photoelectric conversion elements that receive light beams passing through different pupil areas of the image pickup optical system, and a second image sensor including second pixels that are arranged two-dimensionally and that receive infrared light entering through the image pickup optical system, wherein each of the second pixels has photoelectric conversion elements that receive light beams passing through different pupil areas of the image pickup optical system, the control method comprising:
detecting a first defocus amount based on signals output from the first image sensor and a second defocus amount based on signals output from the second image sensor as focus detection results;
determining a position that internally divides the first defocus amount and the second defocus amount as a lens position of the image pickup optical system; and
determining an exposure condition of a time of image pickup with the first image sensor and the second image sensor according to the focus detection results.

16. A control method for an image pickup apparatus that has an image sensor including first pixels and second pixels that are arranged two-dimensionally and that respectively receive visible light and invisible light entering through an image pickup optical system, wherein each of the first pixels and the second pixels has photoelectric conversion elements that receive light beams passing through different pupil areas of the image pickup optical system, and a storage circuit that stores correction data that shows a difference in an optical characteristic between a light beam that is received by the first pixels and a light beam that is received by the second pixels, the control method comprising:
detecting a focus detection result from one of a group of signals output from the first pixels and a group of signals output from the second pixels;

determining a lens position of the image pickup optical system based on the focus detection result; and estimating an image deviation amount between parallax images obtained from signals that are not used for detecting the focus detection result using the correction data.

17. A control method for an image pickup apparatus that has a first image sensor including first pixels that are arranged two-dimensionally and that receive visible light entering through an image pickup optical system, wherein each of the first pixels has photoelectric conversion elements that receive light beams passing through different pupil areas of the image pickup optical system, a second image sensor including second pixels that are arranged two-dimensionally and that receive infrared light entering through the image pickup optical system, wherein each of the second pixels has photoelectric conversion elements that receive light beams passing through different pupil areas of the image pickup optical system, and a storage circuit that stores correction data that shows a difference in an optical characteristic between a light beam that is received by the first image sensor and a light beam that is received by the second image sensor, the control method comprising:

detecting a focus detection result from signals output from one of the first image sensor and the second image sensor;

determining a lens position of the image pickup optical system based on the focus detection result; and estimating an image deviation amount between parallax images obtained from signals that are not used for detecting the focus detection result using the correction data.

18. A non-transitory computer-readable storage medium storing a control program causing a computer to execute a control method for an image pickup apparatus that has an image sensor including first pixels and second pixels that are arranged two-dimensionally and that respectively receive visible light and invisible light entering through an image pickup optical system, wherein each of the first pixels and the second pixels has photoelectric conversion elements that receive light beams passing through different pupil areas of the image pickup optical system, the control method comprising:

detecting a first defocus amount based on signals output from the first pixels and a second defocus amount based on signals output from the second pixels as focus detection results;

determining a position that internally divides the first defocus amount and the second defocus amount as a lens position of the image pickup optical system; and determining an exposure condition of a time of image pickup with the image sensor according to the focus detection results.

19. A non-transitory computer-readable storage medium storing a control program causing a computer to execute a control method for an image pickup apparatus that has a first image sensor including first pixels that are arranged two-dimensionally and that receive visible light entering through an image pickup optical system, wherein each of the first pixels has photoelectric conversion elements that receive light beams passing through different pupil areas of the image pickup optical system, and a second image sensor including second pixels that are arranged two-dimensionally and that receive infrared light entering through the image pickup optical system, wherein each of the second pixels has photoelectric conversion elements that receive light beams passing through different pupil areas of the image pickup optical system, the control method comprising:

detecting a first defocus amount based on signals output from the first image sensor and a second defocus amount based on signals output from the second image sensor as focus detection results;

determining a position that internally divides the first defocus amount and the second defocus amount as a lens position of the image pickup optical system; and determining an exposure condition of a time of image pickup with the first image sensor and the second image sensor according to the focus detection results.

20. A non-transitory computer-readable storage medium storing a control program causing a computer to execute a control method for an image pickup apparatus that has an image sensor including first pixels and second pixels that are arranged two-dimensionally and that respectively receive visible light and invisible light entering through an image pickup optical system, wherein each of the first pixels and the second pixels has photoelectric conversion elements that receive light beams passing through different pupil areas of the image pickup optical system, and a storage circuit that stores correction data that shows a difference in an optical characteristic between a light beam that is received by the first pixels and a light beam that is received by the second pixels, the control method comprising:

detecting a focus detection result from one of a group of signals output from the first pixels and a group of signals output from the second pixels;

determining a lens position of the image pickup optical system based on the focus detection result; and estimating an image deviation amount between parallax images obtained from signals that are not used for detecting the focus detection result using the correction data.

21. A non-transitory computer-readable storage medium storing a control program causing a computer to execute a control method for an image pickup apparatus that has a first image sensor including first pixels that are arranged two-dimensionally and that receive visible light entering through an image pickup optical system, wherein each of the first pixels has photoelectric conversion elements that receive light beams passing through different pupil areas of the image pickup optical system, a second image sensor including second pixels that are arranged two-dimensionally and that receive infrared light entering through the image pickup optical system, wherein each of the second pixels has photoelectric conversion elements that receive light beams passing through different pupil areas of the image pickup optical system, and a storage circuit that stores correction data that shows a difference in an optical characteristic between a light beam that is received by the first image sensor and a light beam that is received by the second image sensor, the control method comprising:

detecting a focus detection result from signals output from one of the first image sensor and the second image sensor;

determining a lens position of the image pickup optical system based on the focus detection result; and estimating an image deviation amount between parallax images obtained from signals that are not used for detecting the focus detection result using the correction data.

22. A control method for an image pickup apparatus that has an image sensor including first pixels and second pixels that are arranged two-dimensionally and that respectively receive visible light and invisible light entering through an image pickup optical system, wherein each of the first pixels and the second pixels has photoelectric conversion elements that receive light beams passing through different pupil areas of the image pickup optical system, the control method comprising:

detecting focus detection results from signals output from the first pixels and signals output from the second pixels;

determining a lens position of the image pickup optical system based on the focus detection results;

determining an exposure condition of a time of image pickup with the image sensor according to the focus detection results; and setting an aperture value of the image pickup optical system so that both an object picked up by the first pixels and an object picked up by the second pixels fall within a depth of field.

23. A control method for an image pickup apparatus that has a first image sensor including first pixels that are arranged two-dimensionally and that receive visible light entering through an image pickup optical system, wherein each of the first pixels has photoelectric conversion elements that receive light beams passing through different pupil areas of the image pickup optical system, and a second image sensor including second pixels that are arranged two-dimensionally and that receive infrared light entering through the image pickup optical system, wherein each of the second pixels has photoelectric conversion elements that receive light beams passing through different pupil areas of the image pickup optical system, the control method comprising:

detecting focus detection results from signals output from the first image sensor and signals output from the second image sensor;

determining a lens position of the image pickup optical system based on the focus detection results;

determining an exposure condition of a time of image pickup with the first image sensor and the second image sensor according to the focus detection results; and setting an aperture value of the image pickup optical system so that both an object picked up by the first image sensor and an object picked up by the second image sensor fall within a depth of field.

24. A non-transitory computer-readable storage medium storing a control program causing a computer to execute a control method for an image pickup apparatus that has an image sensor including first pixels and second pixels that are arranged two-dimensionally and that respectively receive visible light and invisible light entering through an image pickup optical system, wherein each of the first pixels and the second pixels has photoelectric conversion elements that receive light beams passing through different pupil areas of the image pickup optical system, the control method comprising:

detecting focus detection results from signals output from the first pixels and signals output from the second pixels;

determining a lens position of the image pickup optical system based on the focus detection results;

determining an exposure condition of a time of image pickup with the image sensor according to the focus detection results; and setting an aperture value of the image pickup optical system so that both an object picked up by the first pixels and an object picked up by the second pixels fall within a depth of field.

25. A non-transitory computer-readable storage medium storing a control program causing a computer to execute a control method for an image pickup apparatus that has a first image sensor including first pixels that are arranged two-dimensionally and that receive visible light entering through an image pickup optical system, wherein each of the first pixels has photoelectric conversion elements that receive light beams passing through different pupil areas of the image pickup optical system, and a second image sensor including second pixels that are arranged two-dimensionally and that receive infrared light entering through the image pickup optical system, wherein each of the second pixels has photoelectric conversion elements that receive light beams passing through different pupil areas of the image pickup optical system, the control method comprising:

detecting focus detection results from signals output from the first image sensor and signals output from the second image sensor;

determining a lens position of the image pickup optical system based on the focus detection results;

determining an exposure condition of a time of image pickup with the first image sensor and the second image sensor according to the focus detection results; and setting an aperture value of the image pickup optical system so that both an object picked up by the first image sensor and an object picked up by the second image sensor fall within a depth of field.

\* \* \* \* \*